United States Patent [19]

Takewell

[11] 4,088,741

[45] May 9, 1978

[54] CARBON BLACK PROCESS

[75] Inventor: Robert B. Takewell, Borger, Tex.

[73] Assignee: J. M. Huber Corporation, Locust, N.J.

[21] Appl. No.: 758,895

[22] Filed: Jan. 13, 1977

Related U.S. Application Data

[63] Continuation-in-part of Ser. No. 663,423, Mar. 3, 1976, abandoned, which is a continuation of Ser. No. 553,782, Feb. 27, 1975, abandoned, which is a continuation of Ser. No. 305,646, Nov. 10, 1972, abandoned.

[51] Int. Cl.² .......................... C01B 31/02; C09C 1/48
[52] U.S. Cl. ..................................... 423/450; 423/456
[58] Field of Search ............... 423/449, 450, 461, 456; 23/259.5

[56] References Cited

U.S. PATENT DOCUMENTS

| | | | |
|---|---|---|---|
| 2,419,565 | 4/1947 | Krejci | 423/457 |
| 2,616,794 | 11/1952 | Krejci | 423/456 |
| 3,235,334 | 2/1966 | Kelmers | 423/456 |
| 3,438,732 | 4/1969 | Morel | 23/259.5 X |
| 3,642,446 | 2/1972 | Heller et al. | 23/259.5 X |
| 3,761,577 | 9/1973 | Dahmon et al. | 423/450 |

*Primary Examiner*—Earl C. Thomas
*Assistant Examiner*—Gregory A. Heller
*Attorney, Agent, or Firm*—Harold H. Flanders; Ernest A. Schaal

[57] ABSTRACT

Methods are disclosed to produce carbon black by diluting the concentration of reactive species by the addition of substantially inert gases to the reactive gas stream prior to the termination of particle growth.

3 Claims, 1 Drawing Figure

CARBON BLACK PROCESS

CROSS-REFERENCES TO RELATED APPLICATIONS

This application is a continuation-in-part of co-pending U.S. application, Ser. No. 663,423 filed Mar. 3, 1976 (now abandoned) which is a continuation of U.S. Application Ser. No. 553,782 filed Feb. 27, 1975 (now abandoned), which is a continuation of U.S. Application Ser. No. 305,646 filed Nov. 10, 1972 (now abandoned).

BACKGROUND OF THE INVENTION

1. Field of the Invention

The present invention relates to methods for making carbon black.

2. Description of the Prior Art

The prior art discloses furnaces for making carbon black which consist of gas and air inlets, one or more oil injectors, a reactor chamber, and quench sections. Furnaces using these elements include those shown in U.S. Pat. Nos. 2,918,353; 3,009,784; 2,616,794; and 3,420,631. Oil feedstock is vaporized and injected into the reaction chamber where an air-gas mixture is combusted. Carbon black particles are formed and pass into a quench section.

The formation of carbon black can be visualized as taking place in three phases: (1) an induction phase in which the hydrocarbons are decomposed into elementary fractions; (2) a phase in which carbon black nuclei are formed; and (3) a particle growth phase in which the carbon black nuclei reacts with other nuclei and with the remaining hydrocarbon fractions. During this third phase, carbon black particles react with gases and other reactive species to produce such side effects as increased carbon monoxide content, oxygen group attachments and porosity. This third phase is ended when the available energy is reduced to a point which will not support further reactions.

The manufacturer has little control over the duration and nature of the processes of nucleation and reaction with the active species and carbon particles.

SUMMARY OF THE INVENTION

It is an object of this invention to provide new methods which overcome the deficiencies of the prior art as indicated above.

A further object of this invention is to produce a more uniform particle size black.

An additional object is to produce a better mixing of the feedstock with the hot combustion gases in the immediate area of conversion.

Other objects and a fuller understanding of the present invention may be had by referring to the following description and claims taken in conjunction with the accompanying drawings.

The present invention overcomes the deficiencies of the prior art and achieves its objectives by providing for the controlled diluting of the concentration of reactive species during the particle growth phase.

BRIEF DESCRIPTION OF THE DRAWINGS

The FIGURE is a sectional elevation view of one embodiment of the present invention.

DESCRIPTION OF THE PREFERRED EMBODIMENTS

Figure 1:
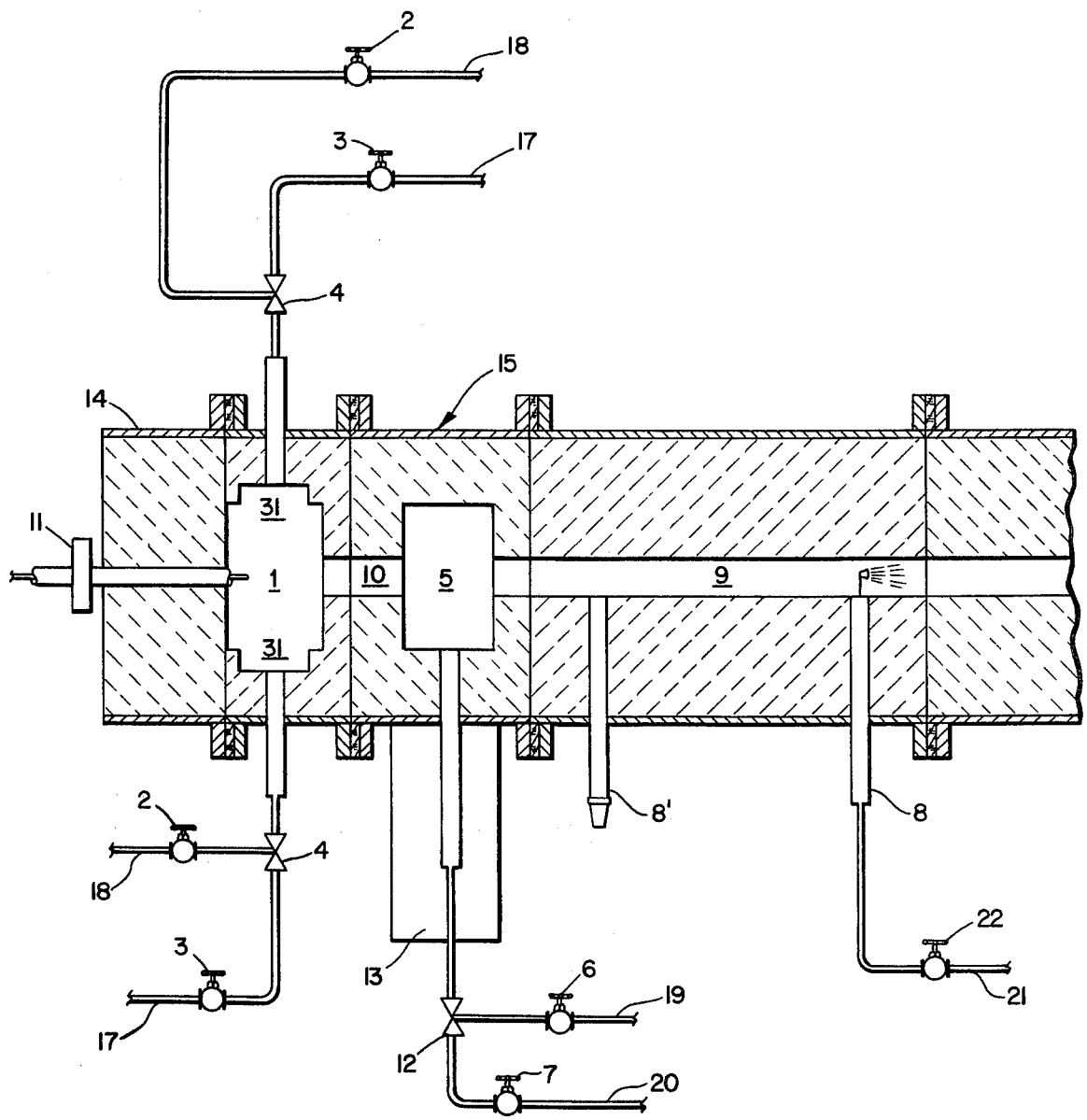

A preferred embodiment of the present invention is shown in FIG. 1. Oil spray injector nozzle 11 is located in the front end section 14 of a cylindrically shaped carbon black furnace 15. The oil injector 11 emits oil vapor and compressed air into the cylindrically shaped primary reaction chamber 1. Chamber 1 is connected to a cylindrically shaped secondary reaction chamber 5 by an inter-chamber connector tube 10. The furnace is lined with refractory material represented by cross-hatching 16. Combustion air supply lines 17 pass air through valves 3 to venturi mixers 4. Combustion gas supply lines 18 feed combustion gas through valves 2 into mixers 4. Mixers 4 are connected to chamber 1. These mixers mix the air and gas and feed it to the tangential inlet slots 31 located in the outer circumference of chamber 1. There the combustion mixture is continuously injected and burned. This forms an envelope of flame around the air/oil spray which is being injected through oil injector 11.

The oil spray injected into chamber 1 is thermally cracked into elementary fractions by heat from the enveloping flame. The products of the thermal cracking, certain combustion products, and uncracked hydrocarbons are forced through tube 10 by the expansion of the combusting gases and by the pressure of the gas, air and oil vapor constantly entering the reactor.

Chamber 5 is similar to chamber 1. An external burner 13 is mounted radially to the outer circumference of chamber 5. A secondary venturi mixer 12 combines combustion gas from the secondary gas supply line 19, through valve 6, and combustion air from the secondary air supply line 20, through valve 7. Mixer 12 feeds this mixture to burner 13 where it is continuously combusted externally to chamber 5. The hot gas which results then passes into chamber 5 and contacts the turbulent mixture which has passed into chamber 5 from chamber 1.

The chamber 5, the flow velocity of the mixture decreases because the cross-sectional area of chamber 5 is larger than that of tube 10. The reactive carbon black nuclei and any remaining uncracked oil vapor are mixed with the combustion gas from burner 13. This gas dilutes the remaining reactive nuclei. It also maintains a high temperature causing thermal cracking of the remaining oil. The carbon black formed then passes with the gases and other products into the cylindrically shaped quench tube 9 where it is cooled by water quench spray 8 or 8'. Any number of quench positions and any length or diameter of quench tube can be used as long as the flow velocity is maintained high enough to prevent settling out of the solid products. The number of quench sprays, their locations, and the dimensions of the quench tube section depend upon the desired length of the particle growth phase.

One result of diluting the reactive species is increased surface area of the carbon black due to smaller particle size. The dilution reduces the opportunity for active nuclei to collide with reactive species or other nuclei to form larger particles.

This dilution also adds heat to the endothermic reaction. Particle size is dependent in part upon the temperature. By maintaining the temperature at a uniform level, the dilution encourages a thorough thermal cracking of all hydrocarbons and maintains a uniform particle size.

In conventional furnaces, the late-forming carbon black particles are substantially different from early-forming particles. This is due to the absorption of heat by the early-formed particles at widely varying temperatures. In the present invention all the carbon particles are formed under substantially the same conditions because the reactive species are insulated from each other and the temperature is kept constant.

An alternative to burner 13 is the recycling of part of the spent combustion gases of the carbon black formation process to an air inlet in chamber 1, tube 10, or chamber 5. This will reduce the concentration of reactive species. It is preferable to add such gases at a temperature near that of the reaction mass.

Another way to dilute the concentration of the reactive species is to add helium or other noble or inert gases and mixtures thereof at the appropriate position in the furnace as taught above.

Different primary and external burner configurations are possible. The number of burners may be increased or decreased. The primary burners may be placed radially on chamber 1 or may be placed parallel to the longitudinal axis of the furnace, in the front end of the furnace. The external burners may be in line, staggered around the circumference, or opposed.

While the invention has been described herein with reference to its preferred embodiments, it will be understood by those skilled in the art that various changes in equivalents may be made to adapt to a particular situation. Therefore, although specific preferred embodiments of the present invention have been described in detail above, the description is not intended to limit the invention to the embodiments disclosed herein, since they are to be recognized as illustrative rather than restrictive. It will be obvious to those skilled in the art, that the invention is not so limited. The invention is declared to cover all changes and modifications of the specific examples of the invention herein disclosed for purposes of illustration, which do not constitute departures from the spirit and scope of the invention.

I claim:

1. In a method of producing carbon black by the thermal decomposition and incomplete combustion of a hydrocarbon oil feedstock comprising:
    (a) injecting a hydrocarbon oil feedstock vapor and air mixture into a primary reaction chamber;
    (b) providing sufficient heat by the combustion of a hydrocarbon gas and air mixture for the thermal decomposition and incomplete combustion of said injected hydrocarbon feedstock;
    (c) passing the hydrocarbon oil feedstock vapor and air mixture and the relative species produced by the thermal decomposition and incomplete combustion of said injected hydrocarbon oil feedstock into a secondary reaction chamber; and
    (d) providing additional heat by the combustion of a hydrocarbon gas and air mixture for continuing thermal decomposition and incomplete combustion of said hydrocarbon feedstock in said secondary reaction chamber;

wherein the improvement comprises diluting the concentration of said relative species in the secondary reaction chamber so as to retard the particle growth and reaction of the carbon black nuclei formed thereby while maintaining substantially the same reaction temperature by the addition of a volume of substantially inert gases radially into the secondary reaction chamber prior to the termination of the reactions producing growth of the carbon black particles, said inert gases being at a temperature substantially the same as the temperature of the gases leaving said primary reaction chamber.

2. The method of claim 1 wherein said diluting substantially inert gases are spent combustion gases.

3. The method of claim 1 wherein said diluting substantially inert gases are produced in a hydrocarbon gas burner external to said primary and secondary reaction chambers.

* * * * *